United States Patent
Tsou et al.

(10) Patent No.: US 11,279,063 B2
(45) Date of Patent: Mar. 22, 2022

(54) METHOD OF PREPARING A BIODEGRADABLE FILM

(71) Applicant: National Tsing Hua University, Hsinchu (TW)

(72) Inventors: Erh-Yeh Tsou, Hsinchu (TW); Ta-Jo Liu, Hsinchu (TW); Jane Wang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 137 days.

(21) Appl. No.: 16/728,080

(22) Filed: Dec. 27, 2019

(65) Prior Publication Data
US 2020/0206983 A1  Jul. 2, 2020

(30) Foreign Application Priority Data
Jan. 2, 2019 (TW) ................. 108100069

(51) Int. Cl.
| B29C 41/42 | (2006.01) |
| B29C 41/50 | (2006.01) |
| B29C 41/20 | (2006.01) |
| B29C 41/00 | (2006.01) |
| B29C 41/46 | (2006.01) |
| B29C 41/12 | (2006.01) |
| B29K 67/00 | (2006.01) |

(52) U.S. Cl.
CPC .......... *B29C 41/003* (2013.01); *B29C 41/20* (2013.01); *B29C 41/42* (2013.01); *B29C 41/50* (2013.01); *B29K 2067/00* (2013.01); *B29K 2801/08* (2013.01); *B29K 2805/00* (2013.01); *B29K 2995/006* (2013.01)

(58) Field of Classification Search
CPC .......................... B32B 37/26; B32B 2037/268
See application file for complete search history.

(56) References Cited

U.S. PATENT DOCUMENTS

2004/0247807 A1* 12/2004 Annan ............... B29C 33/18
428/35.7
2017/0100912 A1* 4/2017 Tricoli ............... B32B 27/12

OTHER PUBLICATIONS

Mohsen Mohsen-Nia et al. (Viscometric study of aqueous poly(vinyl alcohol) (PVA) solutions as a binder in adhesive formulations, 2012, hereinafter Mohsen) (Year: 2012).*

* cited by examiner

*Primary Examiner* — Kelly M Gambetta
*Assistant Examiner* — Andrés E. Behrens, Jr.
(74) *Attorney, Agent, or Firm* — WPAT, PC

(57) ABSTRACT

Provided is a method of preparing a biodegradable film, which comprises the steps of coating a soluble supporting solution on a substrate, coating a prepolymer solution, pre-drying, crosslinking, and separating. With the technical means, the method can separate the biodegradable film from the substrate smoothly, thereby ensuring the film integrity of the produced biodegradable film.

13 Claims, 1 Drawing Sheet

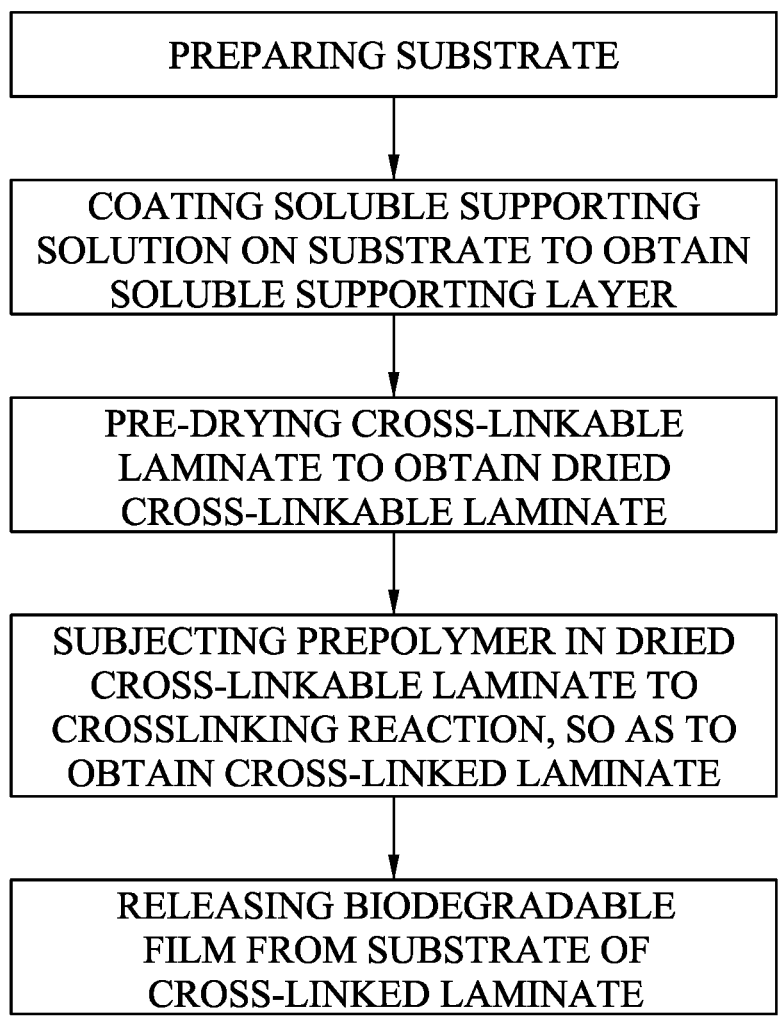

METHOD OF PREPARING A BIODEGRADABLE FILM

CROSS-REFERENCE TO RELATED APPLICATION

Pursuant to 35 U.S.C. § 119(a), this application claims the benefit of the priority to Taiwan Patent Application No. 108100069, filed Jan. 2, 2019. The content of the prior application is incorporated herein by its entirety.

BACKGROUND OF THE INVENTION

1. Field of the Invention

The present invention relates to a method of preparing a polymer film, especially to a method of preparing a biodegradable film.

2. Description of Related Art

Biodegradable materials are plastics that can be degraded in nature. Under the condition that there is plenty of moisture and oxygen together with appropriate microorganisms in the place of burial, the biodegradable materials can be decomposed into carbon dioxide, methane and water, a process of returning the biodegradable materials to the natural circulation. Correspondingly, the burden on environment brought by plastic products will be reduced. Therefore, researchers and the industries have put much attention to the development and research of biodegradable materials, aiming to achieve environmental sustainability and the booming of green economy.

The biodegradable material firstly developed is poly (lactic acid), or PLA. By extracting grain crops such as corn, wheat, sugarbeet and potatoes, lactic acids could be produced and then be further synthesized into PLA through polymerization. As the cost of PLA materials is very high, even reaching 90,000 Taiwan dollars per ton due to the fact that its raw materials are grain crops, it cannot meet the market demand for low cost.

Aside from PLA materials, researchers have already tried to develop other alternative biodegradable materials, for example, using glycerol, a by-product of biodiesel as raw materials to produce biodegradable materials. In 2002, the team led by Dr. Langer succeeded in developing a biodegradable material called poly (glycerol sebacate), PGS, with glycerol and sebacic acid as the raw materials. As PGS takes glycerol as the raw materials instead of grain crops, it significantly reduces cost, much lower than that of the PLA materials, and meets the needs of the market.

The current methods of preparing a polymer film include melt extrusion, blow molding, or solvent casting. Among them, melt extrusion and blow molding both need to heat the polymer materials into a molten state before further processing, so both methods are only applicable to the thermoplastic polymer materials, but not to those thermosetting polymer materials; solvent casting refers to preparing the polymer film by dissolving polymer materials into solvents without heating the polymer materials to a molten state, therefore, it is applicable to both thermoplastic and thermosetting polymer materials.

Although solvent casting can be used for both thermoplastic and thermosetting polymer materials, it is susceptible to the impact of soluble supporting membrane and cross-linking reaction in the subsequent steps, making it very common that the polymer film cannot be easily removed from the soluble supporting membrane, or the polymer film is very fragile when the current technology of solvent casting is adopted. All these factors have gradually damaged the competitiveness of solvent casting, and at present, melt extrusion and blow molding are still more preferred for preparing polymer films.

SUMMARY OF THE INVENTION

In consideration of the above, one of the purposes of the present invention is to overcome the drawbacks of solvent casting preparation and anticipates it will successfully be used for preparing biodegradable films, and the biodegradable films so produced can not only be smoothly removed from the soluble supporting membrane but kept intact as well.

Another purpose of the present invention is to develop a continuous production method of the biodegradable film to realize mass production.

In order to achieve the above purposes, the method of preparing a biodegradable film of the present invention includes the following steps in order:

(1) Coating a soluble supporting solution on a substrate to form a soluble supporting layer on the substrate, wherein a material of such soluble supporting solution includes glucose, fructose, galactose, saccharose, maltose, lactose, corn syrup, methyl cellulose, carboxymethyl cellulose (CMC), hydroxyethyl cellulose (HEC), carboxymethyl hydroxyethylcellulose (CMHEC), hydroxypropyl cellulose (HPC), hydroxypropyl methyl cellulose (HPMC), starch, chitosan, chitin, polyvinyl alcohol (PVA) or any their combinations;

(2) Coating a prepolymer solution on the soluble supporting layer to obtain a cross-linkable laminate, the cross-linkable laminate comprising the substrate, the soluble supporting layer and the prepolymer solution in a bottom-up sequence;

(3) Pre-drying the cross-linkable laminate to dry the prepolymer solution into a prepolymer layer so that a dried cross-linkable laminate is obtained, such prepolymer layer containing prepolymer;

(4) Subjecting the prepolymer in the dried cross-linkable laminate to a crosslinking reaction to obtain a cross-linked laminate, such cross-linked laminate contains the substrate, the soluble supporting layer and the biodegradable film, the biodegradable film is formed by the crosslinking reaction of the prepolymer;

(5) Releasing the biodegradable film from the substrate of the cross-linked laminate.

The advantages of the method of preparing the biodegradable film of the present invention over the prior art includes at least:

(a) The soluble supporting layer formed by the soluble supporting solution with appropriate materials is able to reduce the complexity in separating the biodegradable film, making such separation from the substrate smoother and the biodegradable film intact;

(b) Pre-drying is arranged before crosslinking, thus a series of problems on the biodegradable film can be prevented such as curling, yellowing or breaking, further improving the quality of the biodegradable film; and (c) As solvent casting is adopted to produce biodegradable films, mass production is achieved and its production cost is reduced, correspondingly increasing its market value.

Preferably, the substrate of the present invention may be a soft substrate or a hard substrate, whose materials include but are not limited to polyethylene terephthalate (PET), Polyethylene naphthalate (PEN), Polyimide (PI), copper, aluminum, glass, steel or their combinations. Preferably, the substrate may be steel plate, copper foil or aluminum foil with smooth and flat surfaces.

It is preferred that the material of soluble supporting solution is carboxymethyl cellulose. With carboxymethyl cellulose as the material of the soluble supporting solution, excessive adhesive strength between the soluble supporting solution and the substrate can be prevented. In addition, it will also promote the complete crosslinking reaction of the prepolymer solution after coating on the soluble supporting layer so as to enhance film formation quality of the biodegradable film. Preferably, the molecular weight of carboxymethyl cellulose ranges from 20,000 to 1,100,000, and the degree of substitution will reach 0.2 to 1.5. Preferably, the lower the molecular weight of the carboxymethyl cellulose is, the higher the degree of substitution is and the better the solubility is.

With regard to the method of biodegradable film preparation of the present invention, before the coating step, some solvents such as acetone, tetrahydrofuran (THF), dimethylformamide (DMF), dimethyl sulfoxide, can be added into the soluble supporting solution to increase its viscosity so that it is able to flow. Preferably, the concentration of the soluble supporting solution is 0.1 wt % to 30% wt, and the viscosity of the soluble supporting solution is 5 cp to 100,000 cp.

With regard to the method of biodegradable film preparation of the present invention, the coating includes but is not limited to blade coating, spray coating, slot die coating, spin coating or their combinations. As for coating the soluble supporting solution through blade coating, the coating clearance may be set to 10 μm to 1500 μm, and the coating speed may be set to 0.05 cm/s to 12 cm/s.

Preferably, the thickness of the soluble supporting layer formed by drying the soluble supporting solution on the substrate may be 0.1 μm to 300 μm. Appropriate control over the thickness of the soluble supporting layer will promote the operation of later separation and ensure the integrity of the biodegradable film.

With regard to the method of biodegradable film preparation of the present invention, the prepolymer can be prepared by a mixture containing polyhydric alcohols and poly acids; in addition, the mixture can also contain other reagents conducive to polymerization reaction. According to the present invention, the candidates for the polyhydric alcohols may be and are not limited to glycerol, ethylene glycol, propylene glycol, butanediol, pentanediol, hexanediol, cyclopentanediol, cyclohexanediol or their combinations, the candidates for the poly acids may be and are not limited to oxalic acid, malonic acid, succinic acid, glutaric acid, adipic acid, pimelic acid, suberic acid, azelaic acid, sebacic acid, butenedioic acid, glutaconic acid, citric acid or their combinations.

Another purpose of the present invention is to recycle and reuse the glycerol, a byproduct of biodiesel, so as to reduce the production cost of the biodegradable film and solve the problem of surplus palm oil. Preferably, the abovementioned polyhydric alcohols are glycerol including technical grade glycerol, reagent grade glycerol, and disposed glycerol, and more preferably, glycerol recycled from the byproduct of biodiesel as the polyhydric alcohol.

With regard to the method of preparing a biodegradable film of the present invention, before the coating step, the viscosity of the prepolymer solution shall be adjusted to ensure it has a proper flowability. Preferably, the concentration of the prepolymer solution can be 30 wt % to 90 wt %, and the viscosity of the prepolymer solution is 500 cp to 46,000 cp.

With regard to the method of preparing a biodegradable film of the present invention, the coating methods include but are not limited to blade coating, slot die coating or their combinations. As to slot die coating the prepolymer solution, the coating clearance may be set to from 10 μm to 1500 μm, and the coating speed may be set to from 0.05 cm/s to 12 cm/s.

Preferably, the thickness of the prepolymer solution is about 5 μm to 1000 μm.

With regard to the method of biodegradable film preparation of the present invention, the temperature in the pre-drying step may be from 25° C. to 90° C., more preferably, from 30° C. to 60° C. The temperature in the pre-drying step is from 25° C. to 90° C., and the pre-drying time is from 1 min to 90 mins. Preferably, the temperature in the pre-drying step is from 50° C. to 80° C., and the pre-drying duration is from 30 mins to 90 mins. More preferably, it is optional that said pre-drying step is conducted under vacuum. In one example, the pre-drying step lasts from 30 mins to 60 mins under vacuum, at a temperature between 50° C. to 80° C. According to the present invention, by properly manipulating the pre-drying temperature and duration, said pre-drying step is helpful for reducing the residual level of solvents in the prepolymer layer of the dried cross-linkable laminate. Therefore, it can prevent the fracture of prepolymer layer or the biodegradable film in the subsequent steps caused by the volatilization of solvents that may arise during the long period standing. Furthermore, proper manipulation of the pre-drying temperature and duration can suppress and prevent defects such as little ribbon bubbles, huge bubbles or pinholes caused during the preparation, so as to improve the film quality of the biodegradable films.

Preferably, after the pre-drying step, the thickness of the prepolymer layer is about 200 μm to 300 μm; in the dried cross-linkable laminate, the residual amount of solvents in the prepolymer layer is less than 40%, more preferably, below the level of from 5% to 30%.

Preferably, pre-drying said cross-linkable laminate may include a two-stage pre-drying step. That means the step of pre-drying of the cross-linkable laminate includes: first, drying the cross-linkable laminate at a low temperature between 25° C. to 50° C. for 1 min to 30 mins; then drying the cross-linkable laminate at a high temperature between 50° C. to 90° C. for 1 min to 89 mins, so as to enhance the film integrity of the biodegradable films. In the abovementioned step, the low temperature pre-drying in the first stage is able to stabilize the film surface of the cross-linkable laminate, and then the high temperature pre-drying in the second stage is able to accelerate the mobilization of solvents in the cross-linkable laminate to the surface and make such mobilization smoother, thereby ensuring and enhancing the film integrity of the biodegradable films and the prepolymer layer in the cross-linkable laminate.

With regard to the method of biodegradable film preparation of the present invention, the crosslinking step may be conducted by photocrosslinking, thermal crosslinking or their combinations. While the photocrosslinking is chosen, the duration of the crosslinking step will be reduced, leading to shortening the preparation time of the whole biodegradable film preparation, and the thermal crosslinking is able to improve the mechanical property of the biodegradable films.

Preferably, said photocrosslinking reaction is conducted under an irradiation dose of 600 mJ/cm$^2$ to 380,000 mJ/cm$^2$.

Preferably, the temperature set for the thermal crosslinking reaction is from 100° C. to 300° C., and the duration of the thermal crosslinking reaction is from half an hour to six hours.

Preferably, when thermal crosslinking is adopted, the thermal crosslinking reaction of the prepolymer in the cross-linkable laminate hereof may be produced under an anoxic condition so as to obtain the cross-linked laminate. According to the present invention, the thermal crosslinking reaction under anoxic condition is helpful in preventing the problems that may arise in biodegradable films including curling, yellowing or breaking, further improving the quality of the biodegradable film.

In one of the examples, said anoxic condition for cross-linking reaction means under an environment in which there is continuous flow of nitrogen, argon, helium, neon, krypton, xenon, radon, carbo dioxide or their combinations at a flow rate from 0.5 L/min to 1 L/min, and the prepolymer in the dried cross-linkable laminate is subjected to the crosslinking reaction under said environment to obtain the cross-linked laminate. In one of the examples, said anoxic condition for crosslinking reaction means under an environment whose vacuum degree is lower than 1 torr, and the prepolymer in the dried cross-linkable laminate is subjected to the cross-linking reaction under said environment to obtain the cross-linked laminate.

Preferably, the step of crosslinking reaction of the prepolymer in the dried cross-linkable laminate under anoxic condition so as to obtain the cross-linked laminate includes: crosslinking reaction of the prepolymer in the dried cross-linkable laminate is conducted under anoxic condition so as to obtain the cross-linked laminate. In one of the examples, the biodegradable film of the present invention may be prepared under anoxic condition, in which, the crosslinking reaction of the prepolymer in the dried cross-linkable laminate first goes through photocrosslinking, then through thermal crosslinking, so as to obtain said cross-linked laminate. In another example, the biodegradable film of the present invention may be prepared under anoxic condition, in which, the crosslinking reaction of the prepolymer in the dried cross-linkable laminate first goes through thermal crosslinking, then through photocrosslinking, so as to obtain said cross-linked laminate.

Preferably, with regard to the method of the biodegradable film preparation of the present invention, said step (5) may use an external force to separate the biodegradable films from the substrate of the cross-linked laminate; or said step (5) may use water to wash the cross-linked laminate and dissolve the soluble supporting layer during washing, and eventually separate the biodegradable films from the substrate of the cross-linked laminate. In addition, the thinner the thickness of the soluble supporting layer, the better the dissolving effect by water washing, so as to ensure the integrity of the biodegradable film. Preferably, said water washing can contribute to batch treatment of substrates of the cross-linked laminates at the same time, and mass production of biodegradable films of the present invention is able to be achieved.

Preferably, the step of separating the biodegradable film from the substrate by water washing the cross-linked laminate includes: placing the cross-linked laminate in water at a temperature between 10° C. and 90° C., wherein the abovementioned soluble supporting layer will dissolve into water. As a result, the biodegradable film and the substrate are separated and the aim of separating biodegradable film from the substrate is achieved.

Preferably, the step of separating the biodegradable film from the substrate by water washing the cross-linked laminate includes: placing the cross-linked laminate in cold water at a temperature between 10° C. and 40° C. to separate the biodegradable film from the substrate. Even more preferably, the cold water bath in the step of water washing may be subject to ultrasonic shaking to further help the smooth separation of the biodegradable film from the substrate.

Preferably, the step of separating the biodegradable film from the substrate by water washing the cross-linked laminate includes: placing the cross-linked laminate in hot water at a temperature between 40° C. to 90° C. to separate the biodegradable film from the substrate, which will prevent curling that may occur to the biodegradable film. More preferably, the hot water bath in the step of water washing may be subject to ultrasonic shaking to further help the smooth separation of the biodegradable film from the substrate and prevent curling that may occur to the biodegradable film.

According to the preparation method of the present invention, Young's modulus of the biodegradable film prepared is in the range from 1 MPa to 2800 MPa, the maximum tensile strength is in the range from 0.25 MPa to 80 MPa, and the elongation at break is between 1.5% and 110%. Therefore, the biodegradable film prepared by the method of the present invention boasts good mechanical performance, making it applicable in fields including packing service, textile and daily accessories.

In addition, when the biodegradable film prepared by the present invention is buried in the environment with plenty of moisture, oxygen and appropriate microorganisms, it can be decomposed into carbon dioxide, methane and water the same as conventional biodegradable films. Therefore, after a period in the landfill, the biodegradable film prepared by the present invention is able to be decomposed and return to the natural cycle, to avoid causing burden to the environment. In practical implementation, the biodegradable film prepared by the present invention can be decomposed provided that the pH is larger than 7; as a result, the biodegradable film prepared by the present invention possesses good usability.

BRIEF DESCRIPTION OF THE DRAWINGS

FIG. 1 is a flow chart of a method of preparing a biodegradable film.

DETAILED DESCRIPTION OF PREFERRED EMBODIMENT

It is apparent that those skilled in the art are able to understand the merits and effects which the present invention can achieve, and make various modifications and variations without departing from the scope and spirit of the invention, so as to implement or applicate the content of the present invention.

Description of the Materials Used in Experiments:
1. Reagent grade glycerol, purchased from Sigma Aldrich, boiling point: 290° C.;
2. Technical grade glycerol, purchased from Echo Chemical;
3. Reagent grade maleic acid, also called (Z)-butenedioic acid, purchased from Sigma Aldrich, white crystalline granules, melting point: from 137° C. to 140° C.;
4. Reagent grade oxalic acid, also called ethanedioic acid, purchased from Sigma Aldrich, white crystalline granules, melting point: from 101° C. to 102° C.;

5. Reagent grade adipic acid, also called hexanedioic acid, purchased from Sigma Aldrich, white crystalline granules, melting point: from 151° C. to 154° C.;
6. Reagent grade sebacic acid, also called decanedioic acid, purchased from Sigma Aldrich, white crystalline powder, melting point: 133-137° C.;
7. Acetone purchased from Echo Chemical;
8. Tetrahydrofuran (THF) purchased from Sigma Aldrich, boiling point: 66° C.;
9. Technical grade polyvinyl alcohol (PVA), purchased from Changchun Corporation Group, model: BP-2400, concentration: 20 wt %, molecular weight: 118,000 to 124,000.
10. Corn syrup purchased from MP Biomedicals, yellow water soluble liquid with high viscosity, ingredients: glucose and fructose;
11. Saccharose purchased from Sigma Aldrich, white solid, solubility in 20° C. water: 2.1 g/ml;
12. Carboxymethyl cellulose (CMC) purchased from Acros Organics, white powder, molecular weight: 70,000, and degree of substitution: 0.9.

Description of the Equipment Used in Experiments:
1. An ultrasonic cleaner, model: LEO-803, its power is set at 80 W, and adjustable temperature range is from 5° C. to 99° C.;
2. A blade coater, manufacturer and model: Zehntner ZUA 2000, adjustable interstice ranging from 0 to 3000 μm;
3. A slot die coater with T-die design: its parental model has two shunts, one has a 0.8 cm flow pass, the other has a 2 cm flow pass, the radius of the interior shunt is 1 cm while that of the exterior is 0.3 cm, the thickness of the model lip is 200 μm and its angle is 135°, and the clearance of the slot die is 0.02 cm and the maximum coating width is 10 cm.
4. A block coater, which includes a DIY marble mobile platform driven by a top screw-driven system and controlled by a computer with a movement speed ranging from 1 to 10 cm/s, the error is less than ±5%, and the abovementioned blade coater and slot die coater can be set above the block coater;
5. A constant temperature and humidity baker, manufacturer and model: Dengying Equipment Co., Ltd., its adjustable temperature range is from 0° C. to 100° C., and the humidity range is from 15% to 90% RH;
6. Handheld ultraviolet lamp, which is used as a light source for the UV-crosslinking reaction, the power of the UV lamp is 400 watt;
7. A wet film thickness gauge, for measuring the thickness of the wet film, model: Erichsen Model 433, measure range: from 5 μm to 1000 μm;
8. A micrometer, for measuring the thickness of the thin film, manufacturer and model: Mitutoyo, operation range: from 0 mm to 25 mm, minimum scale: 1 μm;
9. A universal tensile machine, able to measure Young's modulus, ultimate tensile strength and elongation at break, manufacturer and model: Shimadzu AGS-2000G Preparation of Prepolymer Solution Before preparing the biodegradable film through solvent casting, glycerol and different kinds of poly acids were used as the raw materials to produce polyester prepolymer by implementing reactions of glycerol with each of such poly acids respectively. In order to facilitate solvent casting operations in subsequent steps, the experiment chooses and mixes appropriate solvents into the polyester prepolymer to adjust its viscosity and eventually obtain the prepolymer solution for later use.

Method of preparing the prepolymer solution will be explicitly depicted through the following examples.

Preparation Examples 1 to 7: Prepolymer Solution Prepared with Acetone as Solvent Preparation examples 1 to 7 basically adopted the following method to prepare the prepolymer solution, their differences being the types of glycerols and poly acids, and the temperature and duration of the polymerization reaction.

In the preparation, glycerol and poly acids were first weighted in mole ratio 1:1, then were placed into a 1 L two-neck bottle with continuous flow of nitrogen gas, then pre-polymerization reaction was conducted according to the temperatures and periods showed in Table 1 to obtain the prepolymer. In the Preparation examples 1 to 7, the foresaid reagent grade and technical grade glycerol could be used, and the poly acids could be the abovementioned adipic acid, sebacic acid, maleic acid, or the combination of adipic acid and maleic acid. As listed in Table 1, Preparation examples 5 to 7 used the combination of adipic acid and maleic acid as poly acids, to be specific, the mole ratio between adipic acid and maleic acid in Preparation example 5 was 3:1, in Preparation example 6 was 1:1, and in Preparation example 7 was 1:3.

TABLE 1

Types of glycerols and poly acids and the reaction temperature and duration of Preparation examples 1 to 7.

| | Material of glycerol | Material of poly acids | Reaction temperature (° C.) | Reaction duration (h) |
|---|---|---|---|---|
| Preparation example 1 | Reagent Grade Glycerol | Adipic acid | 150 | 11 to 13 |
| Preparation example 2 | Reagent Grade Glycerol | Sebacic acid | 130 | 24 to 28 |
| Preparation example 3 | Technical Grade Glycerol | Maleic acid | 140 | 4 to 6 |
| Preparation example 4 | Reagent Grade Glycerol | Maleic acid | 140 | 4 to 6 |
| Preparation example 5 | Reagent Grade Glycerol | Adipic acid:maleic acid = 3:1 | 160 | 3 to 7 |
| Preparation example 6 | Reagent Grade Glycerol | Adipic acid:maleic acid = 1:1 | 160 | 3 to 7 |
| Preparation example 7 | Reagent Grade Glycerol | Adipic acid:maleic acid = 1:3 | 160 | 3 to 7 |

Besides the abovementioned glycerols and poly acids, one person skilled in the art may also choose other aliphatic dibasic acids or other aromatic dibasic acids to undergo the pre-polymerization reaction to obtain the prepolymer for preparation of biodegradable films.

Then in a closed environment, said prepolymer and acetone were mixed at the ratio of 1:0.25 in volume before placed in an ultrasonic washing machine. The mixed solution was heated to 60° C. and continuously shaken until the prepolymer solution fully dissolved into acetone. It was then stirred for 24 hours to ensure complete dissolution and well dispersed so as to obtain the prepolymer solution of Preparation examples 1 to 7.

Through the above, the viscosity of said prepolymer solution was controlled under 7000 cp so that it could be used for subsequent solvent casting process and eventually for the smooth production of biodegradable films.

Preparation Example 8: Prepolymer Solution Prepared with THF as Solvent

Preparation of the prepolymer solution of Preparation example 8 was roughly the same as that of Example 4, but differed in that Preparation example 8 used THF as solvent to adjust the viscosity of the prepolymer solution. To be specific, the prepolymer similarly prepared as Example 4 was mixed with THF at 1:0.25 in volume, then was placed in an ultrasonic washing machine. The mixed solution was heated to 60° C. and continuously shaken until the prepolymer solution completely dissolved into acetone. It was then stirred for 24 hours to ensure complete dissolution and homodisperse to obtain the prepolymer solution of Example 8 (viscosity around 45,000 cp).

Method of Preparing Biodegradable Film

In order to overcome the problems of biodegradable films prepared by traditional solvent casting, the biodegradable film is prepared by using solvent casting. With reference to FIG. 1, the method includes the following steps:

1) Preparing a proper substrate;
2) Coating the soluble supporting solution on the substrate followed by drying to obtain the soluble supporting layer;
3) Coating a prepolymer solution on the soluble supporting layer to obtain a cross-linkable laminate;
4) Pre-drying said cross-linkable laminate to obtain a dried cross-linkable laminate;
5) Subjecting the prepolymer in the dried cross-linkable laminate to crosslinking reaction so as to obtain the cross-linked laminate;
6) Obtaining the biodegradable film by separating the abovementioned cross-linked laminate from the substrate.

Method of prepolymer solution preparation will be explicitly depicted through examples.

Examples 1, 2, 3-1, 3-2, 4-1, 4-2, and 5 to 8: Choosing Different Prepolymer Solutions and Crosslinking Methods to Prepare Biodegradable Films The biodegradable films of Examples 1, 2, 3-1, 3-2, 4-1, 4-2, and 5 to 8 generally adopted the same solvent casting and dissolving method to obtain biodegradable films. The Examples differed mainly in the types of prepolymer solutions and crosslinking methods. Specifically, the prepolymer solutions for preparing the biodegradable films of Examples 1, 2, and 5 to 8 used the prepolymer solutions of the above Preparation examples 1, 2, and 5 to 8 respectively, while the prepolymer solutions for preparing the biodegradable films of Examples 3-1 and 3-2 used the prepolymer solutions of the above Preparation example 3, and the prepolymer solutions for preparing the biodegradable films of Examples 4-1 and 4-2 used the prepolymer solution of the above Preparation example 4.

First, an aluminum foil with a 20 cm×14 cm coating area was taken as the substrate for coating soluble supporting solution and prepolymer solution in the later steps. In other examples, the substrate may be and is not limited to other metal substrates (e.g., copper plate, copper foil, steel plate) or polymer substrate (e.g., PET)

Then in a closed environment, the CMC was slowly added into a small amount of deionized water. After the CMC was fully dissolved, the solution viscosity was adjusted by adding deionized water; it was then stirred for 24 hours to ensure complete dissolution and well dispersed to obtain the soluble supporting solution. Preferably, the soluble supporting solution was 1.5 wt % CMC water solution, and the viscosity of the soluble supporting solution was 17,000 cp.

After the soluble supporting solution was prepared, the substrate of aluminum foil was pasted onto the platform of the block coater and equipped with the blade coater. Then, the soluble supporting solution was blade coated on the substrate of aluminum foil at a speed of 5 cm/s and the coating clearance of slot was set to 250 μm. After the coating was completed, the aluminum foil substrate coated with the soluble supporting solution was placed into a baker for drying for 15-20 mins so as to form a 2-4 μm thick soluble supporting layer on the substrate.

When the soluble supporting layer was formed on the aluminum foil substrate with proper thickness, it should be shook to remove bubbles by ultrasonic washing machine before further coating so as to prevent the problems of prepolymer solution absorbing moisture or solvents missing. Then the prepolymer solution was filled into a needle cylinder which was fixed on a needle cylinder pump and the slot die coater was erected above the block coater platform. Different types of prepolymer solutions were coated on the aluminum foil substrate with the soluble supporting layer on it to obtain the cross-linkable laminate. Therefore, at present the cross-linkable laminate comprised the aluminum foil substrate, the soluble supporting layer formed thereof, and the prepolymer solution on the soluble supporting layer. The thickness of the prepolymer solution on the soluble supporting layer was about from 350 μm to 450 μm as measured by a wet film thickness gauge.

Then said cross-linkable laminate went through pre-drying for 90 mins at 50° C. to make the thickness of the prepolymer layer shrink to from 200 μm to 270 μm, to obtain a dried cross-linkable laminate. The residual of solvents in the prepolymer layer accounted for 30-45% after the pre-drying step. The residual of solvents hereof refers to the ratio of the amount of solvents in the prepolymer layer after drying to that of the original solvents in the prepolymer solution before drying.

Next, the prepolymer in the dried cross-linkable laminate was subjected to crosslinking reaction in a nitrogen environment at a flow rate in the range from 0.5 L/min to 1 L/min, so as to obtain the cross-linked laminate. After the crosslinking reaction was completed, said cross-linked laminate comprised an aluminum foil substrate, a soluble supporting layer and a biodegradable film in a bottom-up sequence. To be specific, the crosslinking reaction and parameters set in each Example were shown in Table 2, wherein, Examples 1, 2, 3-1, 4-1 and 5 to 7 used photocrosslinking in the crosslinking step while Examples 3-2, 4-2 and 8 used thermal crosslinking.

TABLE 2

Temperature and duration of thermal crosslinking or of photocrosslinking used in the crosslinking step of Examples 1, 2, 3-1, 3-2, 4-1, 4-2, and 5 to 8.

| | Temperature of thermal crosslinking | Duration of thermal crosslinking | Temperature of photocrosslinking | Duration of photocrosslinking |
|---|---|---|---|---|
| Example 1 | 150° C. | 48 h | — | — |
| Example 2 | 130° C. | 48 h | — | — |
| Example 3-1 | 140° C. | 48 h | — | — |
| Example 3-2 | — | — | 28800 mJ/cm$^2$ | 30 mins |
| Example 4-1 | 140° C. | 48 h | — | — |
| Example 4-2 | — | — | 28800 mJ/cm$^2$ | 30 mins |
| Example | 180° C. | 8 h | — | — |

TABLE 2-continued

Temperature and duration of thermal crosslinking or of photocrosslinking used in the crosslinking step of Examples 1, 2, 3-1, 3-2, 4-1, 4-2, and 5 to 8.

|  | Temperature of thermal crosslinking | Duration of thermal crosslinking | Temperature of photocross-linking | Duration of photocross-linking |
|---|---|---|---|---|
| Example 5 |  |  |  |  |
| Example 6 | 180° C. | 8 h | — | — |
| Example 7 | 180° C. | 8 h | — | — |
| Example 8 | — | — | 28800 mJ/cm$^2$ | 30 mins |

In the end, the cross-linked laminate was immersed in cold water at 25° C. for 3 hours for water washing, the soluble supporting layer could be dissolved into water, and as a result, the biodegradable film was separated from the aluminum foil substrate and the aim of separation between biodegradable film and the substrate was achieved. At such an extent, it was also feasible that the separation step was carried out by external force; for example, the biodegradable film was peeled off from the substrate only by hands to complete biodegradable film preparation.

A universal tensile machine was used to test the biodegradable films of Examples 1, 2, 3-1, 3-2, 4-1, 4-2, and 5 to 8, the results including Young's modulus, ultimate tensile strength and elongation at break as shown in Table 3.

TABLE 3

Analysis results of biodegradable films of Examples 1, 2, 3-1, 3-2, 4-1, 4-2, and 5 to 8.

|  | Young's modulus (MPa) | Elongation at break (%) | Ultimate tensile strength |
|---|---|---|---|
| Example 1 | 169.63 | 3.72 | 2.75 |
| Example 2 | 1.22 | 45.52 | 0.51 |
| Example 3-1 | 2154.73 | 40.77 | 30.57 |
| Example 3-2 | 95.06 | 6.05 | 4.81 |
| Example 4-1 | 1515.73 | 5.12 | 27.07 |
| Example 4-2 | 167.98 | 7.54 | 9.08 |
| Example 5 | 16.28 | 4.69 | 0.33 |
| Example 6 | 26.07 | 4.08 | 0.54 |
| Example 7 | 98.65 | 22.41 | 3.29 |

Examples 9 to 11: Biodegradable Film Prepared by Modifying the Coating Methods of Soluble Supporting Solution Preparation of the biodegradable films of Examples 9 to 11 was basically the same as that of Example 4-1, but was different mainly in the coating method of the soluble supporting solution, leading to the difference in thickness of the soluble supporting layer on the substrate after drying.

To be specific, Example 9 used blade coater to coat the soluble supporting solution on the aluminum foil substrate with a 100 µm coating clearance, and the soluble supporting layer formed on the aluminum foil substrate after drying was 1 µm thick. Example 10 used blade coater to coat the soluble supporting solution on the aluminum foil substrate with a 50 µm coating clearance, and the soluble supporting layer formed on the aluminum foil substrate after drying was 0.5 µm thick. Example 11 used spraying coater to coat the soluble supporting solution on the aluminum foil substrate, and the soluble supporting layer formed on the aluminum foil substrate after drying was 0.25 µm thick.

Compared with the thickness of the soluble supporting layer of Example 4-1, those of Examples 9 to 11 gradually reduced in their numerical order. The cross-linked laminates of Examples 9 to 11 were washed with water by the method used in Example 4-1, and the results showed that, the thinner the soluble supporting layer was, the better separation result achieved by water washing the cross-linked laminates, and it contributed to the smooth separation of the biodegradable film from the substrate and the integrity of the biodegradable film.

Besides that Example 4-1 could use water washing to successfully prepare the biodegradable film, it was also possible to use external force to separate the biodegradable film together with the soluble supporting layer from the substrate, and to water wash the cross-linked laminate containing the biodegradable film and the soluble supporting layer to remove the soluble supporting layer by dissolving, and eventually the biodegradable film was obtained.

Examples 12 and 13: Biodegradable Film Prepared by Choosing Different Types of Soluble Supporting Solutions Preparations of the biodegradable films of Examples 12 and 13 were basically the same as that of Example 4-1, but were different mainly in that the soluble supporting solution of Example 12 was 60 wt % sucrose solution, and the viscosity of the sucrose solution was 5.4 cp; the soluble supporting solution of Example 13 was 70 wt % corn syrup solution, and its viscosity was 70 cp.

The comparison with Example 12 and Example 13 showed that it was possible to facilitate the subsequent dissolution by taking CMC water solution as the soluble supporting solution, and the biodegradable film of Example 4-1 was able to be effectively and completely separated from the substrate.

Example 14: Biodegradable Film Prepared by Adjusting the Coating Methods of Soluble Supporting Solution Preparation of the biodegradable film of Example 14 was basically the same as that of Example 4-1, but was different mainly in the coating clearance adopted in coating the prepolymer solution, which led to the difference in thickness of the prepolymer layer on the substrate after drying.

Specifically, Example 14 used blade coater to coat the prepolymer solution on the aluminum foil substrate with the soluble supporting layer at the speed of 1.0 cm/s and in a 500 µm coating clearance to obtain the cross-linkable laminate. After pre-drying, the thickness of the prepolymer layer of the cross-linkable laminate was about 300-400 µm.

Compared with the method of preparing the biodegradable film of Example 14, preparation method of Example 4-1 (coating prepolymer solution through slot die coating) was able to get a biodegradable film with improved flatness, so as to raise the film quality of the biodegradable film.

Examples 15 to 17: Biodegradable Film Prepared by Adjusting the Pre-Drying Step

The biodegradable films of Examples 15 to 17 were prepared basically the same as that of Example 4-1, but were different mainly in the parameters set in the pre-drying step.

In Examples 15 to 17, the prepolymer solution of Preparation example 4 was first coated on each soluble supporting layer of the aluminum foil substrate, then dried at the temperature shown in Table 4 to pre-dry the cross-linkable laminate for 90 mins to obtain a dried cross-linkable laminate. The residual amount of solvents in prepolymer layer of the dried cross-linkable laminate was shown in Table 4.

Examples 18 to 21: Biodegradable Film Prepared by Choosing Different Types of Prepolymer Solutions and by Adjusting the Parameters of the Pre-Drying Step Preparations of the biodegradable films of Examples 18 to 21 were basically the same as that of Example 4-2, but were different mainly in the parameters set in the pre-drying step, and furthermore, the different types of prepolymer solutions chosen to prepare the prepolymer layer.

In Examples 18 to 21, the prepolymer solution of Preparation example 8 was first coated onto each of the aluminum foil substrates with soluble supporting layers, then pre-dried the cross-linkable laminate for 90 mins according to the temperatures shown in Table 4, to obtain a dried cross-linkable laminate. The residual amount of solvents in the prepolymer layer of the dried cross-linkable laminate of Examples was shown in Table 4.

TABLE 4

Sample No., temperature set in the pre-drying step and the residual amount of solvents in prepolymer layer after pre-drying of Example 4-2, Example 8 and Examples 15 to 20.

|  | Prepolymer solution | Pre-drying temperature | Residual amount |
| --- | --- | --- | --- |
| Example 15 | Preparation example 4 | 30° C. | 44.8% |
| Example 16 | Preparation example 4 | 40° C. | 37.6% |
| Example 4-2 | Preparation example 4 | 50° C. | 31.1% |
| Example 17 | Preparation example 4 | 60° C. | 26.7% |
| Example 18 | Preparation example 8 | 30° C. | 51.2% |
| Example 19 | Preparation example 8 | 40° C. | 43.1% |
| Example 8 | Preparation example 8 | 50° C. | 42.2% |
| Example 20 | Preparation example 8 | 60° C. | 35.6% |

Prepolymer solution Pre-drying Residual amount temperature

Examples 21 to 23: In the Biodegradable Film Preparation, Pre-Drying was Divided into Two Stages The biodegradable film preparation of Examples 21 to 23 basically adopted the method of Example 4-2, but was different mainly in the parameters set in the pre-drying step, and furthermore, the different types of prepolymer solutions chosen to prepare the prepolymer layer.

In Examples 21 to 23, the prepolymer solution of Preparation example 4-2 was first coated on each of the aluminum foil substrates with soluble supporting layers, and pre-dried the cross-linkable laminate for the first stage according to the temperature and duration shown in Table 5 before carrying out the second stage pre-drying, so as to obtain a dried cross-linkable laminate. The residual amount of solvents in prepolymer layer of the dried cross-linkable laminate of Examples was shown in Table 5.

TABLE 5

Sample Nos., temperatures designed in the first stage and second stage pre-drying step and the residual amount of solvents in prepolymer layer after pre-drying of Example 4-2, Example 8 and Examples 21 to 23.

|  | First stage pre-drying | | Second stage pre-drying | | Residual amount of solvents |
| --- | --- | --- | --- | --- | --- |
|  | Temperature | Duration | Temperature | Duration | |
| Example 21 | 30° C. | 10 mins | 70° C. | 80 mins | 35.0% |
| Example 22 | 30° C. | 20 mins | 70° C. | 70 mins | 35.1% |
| Example 73 | 30° C. | 30 mins | 70° C. | 60 mins | 35.0% |

As shown in the table above, while the pre-drying steps were the same on temperature and other aspects, Examples 21 to 23 adopted the two stage pre-drying step, their residual amount of solvents in the prepolymer layer of the dried cross-linkable laminate was roughly the same as that of Example 4-2 (adopted one stage pre-drying step), but the two stage pre-drying step was able to facilitate the improvement of film smoothness of the biodegradable film, making its biodegradable film superior to that of Example 4-2 on film smoothness.

Examples 24 to 35: Preparing Biodegradable Films by Combining Photocrosslinking with Thermal Crosslinking Preparations of biodegradable films of Examples 24 to 35 were basically the same as the method of Example 4-1, and their methods were different mainly in that Examples 24 to 35 adopted a crosslinking method combined photocrosslinking with thermal crosslinking to prepare the biodegradable film.

The crosslinking step was divided into the first stage and the second stage according to sequential order, the durations for both photocrosslinking and thermal crosslinking of Examples 24 to 35 were shown in Table 6, wherein, the power of photocrosslinking was set at 400 watt and the temperature of thermal crosslinking was set at 140° C.

TABLE 6

Durations required in thermal crosslinking and photocrosslinking of Examples 24 to 35.

|  | First stage | | Second stage | |
| --- | --- | --- | --- | --- |
|  | Cross-linking type | Duration of crosslinking | Cross-linking type | Duration of crosslinking |
| Example 24 | Thermal crosslinking | 2 hours | Photocrosslinking | 10 mins |
| Example 25 | Thermal crosslinking | 2 hours | Photocrosslinking | 20 mins |
| Example 26 | Thermal crosslinking | 3 hours | Photocrosslinking | 5 mins |
| Example 27 | Thermal crosslinking | 3 hours | Photocrosslinking | 10 mins |
| Example 28 | Thermal crosslinking | 3 hours | Photocrosslinking | 20 mins |
| Example 29 | Photocrosslinking | 5 mins | Thermal crosslinking | 2 hours |
| Example 30 | Photocrosslinking | 5 mins | Thermal crosslinking | 3 hours |
| Example 31 | Photocrosslinking | 10 mins | Thermal crosslinking | 2 hours |

TABLE 6-continued

Durations required in thermal crosslinking and photocrosslinking of Examples 24 to 35.

| | First stage | | Second stage | |
|---|---|---|---|---|
| | Cross-linking type | Duration of crosslinking | Cross-linking type | Duration of crosslinking |
| Example 32 | Photocross-linking | 10 mins | Thermal crosslinking | 3 hours |
| Example 33 | Photocross-linking | 20 mins | Thermal crosslinking | 1 hour |
| Example 34 | Photocross-linking | 20 mins | Thermal crosslinking | 2 hours |
| Example 35 | Photocross-linking | 20 mins | Thermal crosslinking | 3 hours |

According to Table 6, whether thermal crosslinking occurred before photocrosslinking, or photocrosslinking occurred before thermal crosslinking, the prepolymer adopted in Examples 24 to 35 was able to react thoroughly, so as to prevent unwanted viscosity produced in the biodegradable film itself that might deteriorate the separation of the biodegradable film from the substrate. In addition, the adoption of photocrosslinking for crosslinking reaction was able to shorten time needed in the crosslinking reaction and to ensure the quality of the film at the same time. This endows the method of preparing a biodegradable film of the present invention with industrial applicability.

Examples 36 to 40: Biodegradable Film Prepared by Adjusting the Water Washing Methods The biodegradable films of Examples 36 to 40 basically adopted the same preparation method of Example 4-1, but they were different mainly in the designed parameters and whether ultrasonic shaking was included in the water washing step.

Temperatures and washing types in the water washing step of Examples 36 to 40 were listed in Table 7, together listed were whether their biodegradable films were able to be successfully dissolved and their film quality determined by naked eyes.

TABLE 7

Conditions designed for the water washing step and biodegradable film dissolution results as well as film quality of Example 4-1, Examples 36 to 40.

| | Washing type | Washing temperature | Washing duration | Dissolution results | Film quality |
|---|---|---|---|---|---|
| Example 4-1 | Cold water bath | 25° C. | 3 hours | Successful removal | Partial curling |
| Example 36 | Cold water bath | 25° C. | 12 hours | Successful removal | Partial curling |
| Example 37 | Cold water bath | 25° C. | 24 hours | Successful removal | slight curling |
| Example 38 | Cold water bath | 25° C. | 48 hours | Successful removal | Good |
| Example 39 | Hot water bath | 60° C. | 30 mins | Successful removal | Good |
| Example 40 | Treatment of ultrasonic shaking during hot water bath | 60° C. | 30 mins | Successful removal | Good |

The biodegradable film preparation steps of Example 4-1 and Examples 36 to 40 demonstrated whether it was cold water bath, hot water bath, or hot water bath accompanied by ultrasonic shaking at the same time (the power was 80 watt) in the step of water washing, and the biodegradable films were all able to be separated from the substrates so as to accomplish the production of biodegradable films.

In addition, a further comparison of biodegradable film preparation between the Example 4-1 and Examples 36 to 40 showed that although bath in normal temperature water was also able to successfully carry out dissolution, the duration of bath required in the step was relatively long; the hot water bath in the water washing step contributed to the superior film quality of the biodegradable film in relatively shorter washing time without the occurring of curling.

Comparative Example 1: Pre-Drying was Absent in the Biodegradable Film Preparation The biodegradable film of Comparative example 1 was prepared basically the same as the method of Example 4-2, and their methods were different mainly in that Comparative example 1 directly implemented the crosslinking reaction of the cross-linkable laminate without the pre-drying step in the biodegradable film preparation.

Compared with the biodegradable film of Example 4-2, as solvents in the prepolymer solution of the biodegradable film prepared by Comparative example 1 were not removed due to the absence of pre-drying step, the biodegradable film of Comparative example 1 was not useable for its obvious problems such as damages on the film.

Comparative Example 2: In the Biodegradable Film Preparation, Photocrosslinking was Conducted without the Enclosure of Nitrogen The biodegradable film of Comparative example 2 was prepared basically the same as that of Example 4-2, and their methods were different mainly in that the photocrosslinking of Comparative example 2 was not implemented in a nitrogen environment. Therefore, the biodegradable film of Comparative example 2 after being separated from the substrate was not able to be used for their obvious curling visible to the naked eyes.

Test Example 1: Test on Degradation

In order to determine whether the biodegradable film prepared by the present invention can be degraded and whether its degradation rate is different by estimation, Test example 1 compared the biodegradable films of Examples 2, 3-1, 4-1 4-2 with commercial biodegradable material (PLA, purchased from Caili Thin Film Co., Ltd.) after treatment of sodium hydroxide solution. In the test, the films of samples were cut into 2 cm*2 cm and were immersed into NaOH solution of 0.1 M, and their weight was observed by the flow of time to calculate the degradation rate of the films. The test results were shown in Table 8.

TABLE 8

Conditions of the water washing step as designed in Examples 36 to 40, biodegradable film dissolution results and film quality of Examples 2, 3-1, 4-1 and 4-2, and those of the commercial degradable material.

| | Immersion duration | | | |
|---|---|---|---|---|
| | 0 h | 12 h | 24 h | 48 h |
| Example 2 | 0% | 5.25% | 6.21% | 81.82% |
| Example 3-1 | 0% | 58.02% | 63.67% | 100.00% |

TABLE 8-continued

Conditions of the water washing step as designed in Examples 36 to 40, biodegradable film dissolution results and film quality of Examples 2, 3-1, 4-1 and 4-2, and those of the commercial degradable material.

| | Immersion duration | | | |
|---|---|---|---|---|
| | 0 h | 12 h | 24 h | 48 h |
| Example 4-1 | 0% | 65.10% | 65.70% | 100.00% |
| Example 4-2 | 0% | 52.00% | 74.56% | 100.00% |
| Commercial Sample | 0% | 0.88% | 1.26% | 3.12% |

Table 8 indicated that compared with the biodegradable film purchased from market, the degradation rate of biodegradable films of Examples 2, 3-1, 4-1 and 4-2 reached 80% or more after a 48-hour immersion in the NaOH solution, especially those of Examples 3-1, 4-1 and 4-2 even reached 100%, but the commercial biodegradable film (PLA) was not even degraded at all, demonstrating there were advantages of the biodegradable film prepared by the present invention over the market products on degradation speed.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of preparing a biodegradable film comprising:
   coating a soluble supporting solution on a substrate to form a soluble supporting layer on the substrate, wherein a material of the soluble supporting solution includes glucose, fructose, galactose, saccharose, maltose, lactose, corn syrup, methyl cellulose, carboxymethyl cellulose, hydroxyethyl cellulose, carboxymethyl hydroxyethylcellulose, hydroxypropyl cellulose, hydroxypropyl methyl cellulose, starch, chitosan, chitin, polyvinyl alcohol or their combinations;
   coating a prepolymer solution on the soluble supporting layer to obtain a cross-linkable laminate, the cross-linkable laminate comprising the substrate, the soluble supporting layer and the prepolymer solution in a bottom-up sequence;
   pre-drying the cross-linkable laminate to dry the prepolymer solution into a prepolymer layer, so as to obtain a dried cross-linkable laminate, the prepolymer layer containing a prepolymer;
   subjecting the prepolymer in the dried cross-linkable laminate to a crosslinking reaction to obtain a cross-linked laminate, wherein the cross-linked laminate contains the substrate, the soluble supporting layer and the biodegradable film, and the biodegradable film is formed by the crosslinking reaction of the prepolymer; and
   releasing the biodegradable film from the substrate of the cross-linked laminate by water washing or peeling.

2. The method as claimed in claim 1, wherein the crosslinking reaction includes photo crosslinking reaction, thermal crosslinking or their combinations.

3. The method as claimed in claim 1, wherein the crosslinking reaction is performed under an anoxic condition to obtain the cross-linked laminate, and a vacuum degree of the anoxic condition is lower than 1 torr.

4. The method as claimed in claim 1, wherein the prepolymer is prepared by a mixture containing a polyhydric alcohol and a poly acid, and the polyhydric alcohol is selected from the group consisting of glycerol, ethylene glycol, propylene glycol, butanediol, pentanediol, hexanediol, cyclopentanediol, cyclohexanediol and their combinations, and the poly acid is selected from the group consisting of oxalic acid, malonic acid, succinic acid, glutaric acid, adipic acid, pimelic acid, suberic acid, azelaic acid, sebacic acid, butenedioic acid, glutaconic acid, citric acid and their combinations.

5. The method as claimed in claim 1, wherein a temperature for pre-drying the cross-linkable laminate is from 25° C. to 90° C.

6. The method as claimed in claim 1, wherein a residual solvent contained in the prepolymer layer is less than 40%.

7. The method as claimed in claim 1, wherein the water washing step includes immersing the cross-linked laminate in water at a temperature between 10° C. and 90° C., so as to release the biodegradable film from the substrate of the cross-linked laminate.

8. The method as claimed in claim 2, wherein the water washing step includes immersing the cross-linked laminate in water at a temperature between 10° C. and 90° C., so as to release the biodegradable film from the substrate of the cross-linked laminate.

9. The method as claimed in claim 3, wherein the water washing step includes immersing the cross-linked laminate in water at a temperature between 10° C. and 90° C., so as to release the biodegradable film from the substrate of the cross-linked laminate.

10. The method as claimed in claim 1, wherein the biodegradable film has Young's modulus ranging from 1 MPa to 2800 MPa, an ultimate tensile strength ranging from 0.25 MPa to 80 MPa, and an elongation at break from 1.5% to 110%.

11. The method as claimed in claim 2, wherein the biodegradable film has Young's modulus ranging from 1 MPa to 2800 MPa, an ultimate tensile strength ranging from 0.25 MPa to 80 MPa, and an elongation at break from 1.5% to 110%.

12. The method as claimed in claim 3, wherein the biodegradable film has Young's modulus ranging from 1 MPa to 2800 MPa, an ultimate tensile strength ranging from 0.25 MPa to 80 MPa, and an elongation at break from 1.5% to 110%.

13. The method as claimed in claim 7, wherein the biodegradable film has Young's modulus ranging from 1 MPa to 2800 MPa, an ultimate tensile strength ranging from 0.25 MPa to 80 MPa, and an elongation at break from 1.5% to 110%.

* * * * *